United States Patent
Huang

(10) Patent No.: US 11,095,902 B2
(45) Date of Patent: Aug. 17, 2021

(54) METHOD FOR IMAGE CODING, ELECTRONIC DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventor: Haidong Huang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/857,075

(22) Filed: Apr. 23, 2020

(65) Prior Publication Data

US 2020/0413070 A1   Dec. 31, 2020

(30) Foreign Application Priority Data

Jun. 28, 2019   (CN) .......................... 201910580046.8

(51) Int. Cl.
*H04N 19/159*   (2014.01)
*H04N 19/154*   (2014.01)
(Continued)

(52) U.S. Cl.
CPC ......... *H04N 19/159* (2014.11); *H04N 19/124* (2014.11); *H04N 19/147* (2014.11);
(Continued)

(58) Field of Classification Search
None
See application file for complete search history.

(56) References Cited

U.S. PATENT DOCUMENTS 8,593,534 B2   11/2013   Gardiner
9,311,537 B2    4/2016   Mai et al.
(Continued)

FOREIGN PATENT DOCUMENTS

CN   1973231 A    5/2007
CN   101198058 A  6/2008
(Continued)

OTHER PUBLICATIONS

Yang Liu et al: "Region-of-Interest Based Resource Allocation for Conversational Video Communication of H.264/AVC", IEEE Transactions on Circuits and Systems for Video Technology. Institute of Electrical and Electronics Engineers, US, vol. 18, No. 1, Jan. 1, 2008 (Jan. 1, 2008), pp. 134-139. XP007908172, ISSN: 1051-8215, DOI:10.1109/TCSVT. 2007.913754* abstract* Section II; Section III*.

(Continued)

*Primary Examiner* — Frederick D Bailey
(74) *Attorney, Agent, or Firm* — Ladas & Parry, LLP

(57) ABSTRACT

A method for image coding, an electronic device and a computer-readable storage medium. The method includes: an object region is acquired from a reference image; a pixel block forming the reference image is acquired, and multiple sets of coded data for the pixel are obtained by coding the pixel block in multiple coding modes respectively, each set corresponding to a respective one of the multiple coding modes; a cost parameter of the pixel block is determined based on a relative position relationship between the pixel block and the object region; a coding cost in each of the multiple coding modes for the pixel block, is obtained according to the cost parameter of the pixel block and the coded data in the coding mode; and a set of coded data corresponding to the coding mode with a lowest coding cost is determined as target coded data for the pixel block.

18 Claims, 12 Drawing Sheets

(51) Int. Cl.
*H04N 19/182* (2014.01)
*H04N 19/147* (2014.01)
*H04N 19/124* (2014.01)
*H04N 19/17* (2014.01)

(52) U.S. Cl.
CPC ........... *H04N 19/154* (2014.11); *H04N 19/17* (2014.11); *H04N 19/182* (2014.11)

(56) References Cited

U.S. PATENT DOCUMENTS

| | | | |
|---|---|---|---|
| 2003/0112870 A1* | 6/2003 | Fukuda | H04N 19/59 375/240.12 |
| 2006/0007308 A1* | 1/2006 | Ide | H04N 5/23218 348/143 |
| 2008/0310507 A1* | 12/2008 | Ye | H04N 19/18 375/240.12 |
| 2010/0027655 A1* | 2/2010 | Matsuo | H04N 19/146 375/240.13 |
| 2010/0220937 A1 | 9/2010 | Furbeck | |
| 2010/0290521 A1 | 11/2010 | Liu | |
| 2011/0109753 A1* | 5/2011 | Srinivasamurthy | H04N 19/61 348/208.4 |
| 2013/0058586 A1 | 3/2013 | Furbeck | |
| 2013/0195178 A1* | 8/2013 | Price | H04N 19/176 375/240.03 |
| 2016/0189619 A1* | 6/2016 | Park | G09G 3/007 345/690 |
| 2016/0330466 A1 | 11/2016 | Moriyoshi | |
| 2018/0027873 A1 | 2/2018 | Nakano et al. | |
| 2018/0278737 A1 | 9/2018 | Posa | |
| 2019/0132594 A1* | 5/2019 | Chung | H04N 19/147 |
| 2019/0313121 A1 | 10/2019 | Eshima | |

FOREIGN PATENT DOCUMENTS

| | | |
|---|---|---|
| CN | 101533512 A | 9/2009 |
| CN | 101867799 A | 10/2010 |
| CN | 106162191 A | 11/2016 |
| CN | 106295678 A | 1/2017 |
| CN | 205883405 U | 1/2017 |
| CN | 106534862 A | 3/2017 |
| CN | 104469167 B | 10/2017 |
| CN | 106686308 B | 2/2018 |
| CN | 104427337 B | 3/2018 |
| CN | 108170817 A | 6/2018 |
| CN | 108900778 A | 11/2018 |
| CN | 109087332 A | 12/2018 |
| CN | 109089047 A | 12/2018 |
| CN | 105847664 B | 1/2019 |
| CN | 109167910 A | 1/2019 |
| CN | 109547781 A | 3/2019 |
| CN | 109792478 A | 5/2019 |
| CN | 109889827 A | 6/2019 |
| CN | 110267041 A | 9/2019 |
| WO | 2018123611 A1 | 7/2018 |

OTHER PUBLICATIONS

Jianwen Chen et al: "Mode Decision on Subjective Quality", 25. Picture Coding Symposium; Apr. 24, 2006-Apr. 26, 2006; Beijing, Apr. 24, 2006 (Apr. 24, 2006), XP03008025 8, * Section 2, Section 3*.

Maung Htoo et al: "Improved region-of-interest based rate control for error resilient HEVC framework" 2016 IEEE International Conference on Digital Signal Processing (DSP), IEEE, Oct. 16, 2016 (Oct. 16, 2016), pp. 286-290, XP033070565, DOI: 10.1109/ICDSP.2016.7868563 [ retrieved on Mar. 1, 2017]*abstract*Section II; Section III *.

International Search Report in the international application No. PCT/CN2020/090344, dated Jul. 29, 2020.

English translation of the Written Opinion of the International Search Authority in the international application No. PCT/CN2020/090344, dated Jul. 29, 2020.

Partial Supplementary European Search Report in the European application No. 20173292.2, dated Jul. 31, 2020.

Zhang, Tao et al. Fast Intra-Mode and CU Size Decision for HEVC IEEE Transactions on Circuits and Systems for Video Technology Aug. 31, 2017(Aug. 31, 2017) No. 8 vol. 27 the whole document.

Li Zheng et al: "Compressive perceptual hashing tracking with online foreground learning", 2015 IEEE International Conference on Robotics and Biomimetics (ROBIO), IEEE, Dec. 6, 2015 (Dec. 6, 2015), pp. 590-595, XP032873128, DOI: 10.1109/ROBIO.2015.7418832 [ retrieved on Feb. 23, 2016]* *Section I; Section II *.

Choi Jongwon et al: "Visual Tracking Using Attention-Modulated Disintegration and Integration", 2016 IEEE Conference on Computer Vision and Pattern Recognition (CVPR), IEEE, Jun. 27, 2016 (Jun. 27, 2016), pp. 4321-4330, XP033021618, DOI: 10.1109/CVPR. 2016. 468 [ retrieved on Dec. 9, 2016]*Section 3.2 *.

Zhaozheng Yin et al: "Likelihood Map Fusion for Visual Object Tracking", Applications of Computer Vision, 2008. WACV 2008. IEEE Workshop on, IEEE, Piscataway, NJ, USA, Jan. 7, 2008 (Jan. 7, 2008), pp. 1-7, XP031273517, ISBN: 978-1-4244-1913-5* Section 1.2; Section 2 *.

Xiang Yu et al: "Subcategory-Aware Convolutional Neural Networks for Object Proposals and Detection", 2017 IEEE Winter Conference on Applications of Computer Vision (WACV), IEEE, Mar. 24, 2017 (Mar. 24, 2017), pp. 924-933, XP033096876, DOI: 10.1109/WACV. 2017.108[ retrieved on May 11, 2017]*Section 3*.

European Search Report in the European application No. 20173292.2, dated Nov. 6, 2020.

First Office Action of the Chinese application No. 201910580046.8, dated Dec. 3, 2020, with search report.

Fu Fangming "Research on adaptive block coding method based on target tracking" Information & Communications 2012 (Sum.No. 117).

Second Office Action of the Chinese application No. 201910580046.8, dated May 7, 2021.

* cited by examiner

METHOD FOR IMAGE CODING, ELECTRONIC DEVICE AND COMPUTER-READABLE STORAGE MEDIUM

CROSS-REFERENCE TO RELATED APPLICATIONS

This application is filed based upon and claims the priority of Chinese patent application No. 201910580046.8, filed on Jun. 28, 2019, the entire contents of which are incorporated herein by reference.

TECHNICAL FIELD

The application relates to the technical field of images, and particularly to a method for image coding, an electronic device and a computer-readable storage medium.

BACKGROUND

Along with the development of image and video technologies, video coding technologies have been applied more and more widely. According to the existing coding technologies, elimination of data redundancy is performed in three main aspects: spatial redundant information, time redundant information and statistical redundant information. For example, in common video compression standards such as H.264/AVC and HEVC/H. 265 a coding scheme including motion compensation, intra-frame prediction and quantification are generally adopted to eliminate redundancies in time and space domains.

BRIEF DESCRIPTION OF THE DRAWINGS

In order to describe the technical solutions in the embodiments of the application or a conventional art more clearly, the drawings required to be used in descriptions about the embodiments or the conventional art will be simply introduced below. It is apparent that the drawings described below are only some embodiments of the application. Other drawings may further be obtained by those of ordinary skill in the art according to these drawings without creative work.

DETAILED DESCRIPTION

For making purposes, technical solutions and advantages of the application clearer, the application will further be described below in combination with the drawings and the embodiments in detail. It is to be understood that specific embodiments described here are only adopted to explain the application and not intended to limit the application.

It can be understood that terms "first", "second" and the like used in the application may be configured in the invention to describe various components but are not intended to limit these components. These terms are only adopted to distinguish a first component from another component. For example, without departing from the scope of the application, a first client may be called a second client and, similarly, the second client may be called the first client. Both the first client and the second client are clients, but they are different clients.

Figure 1:
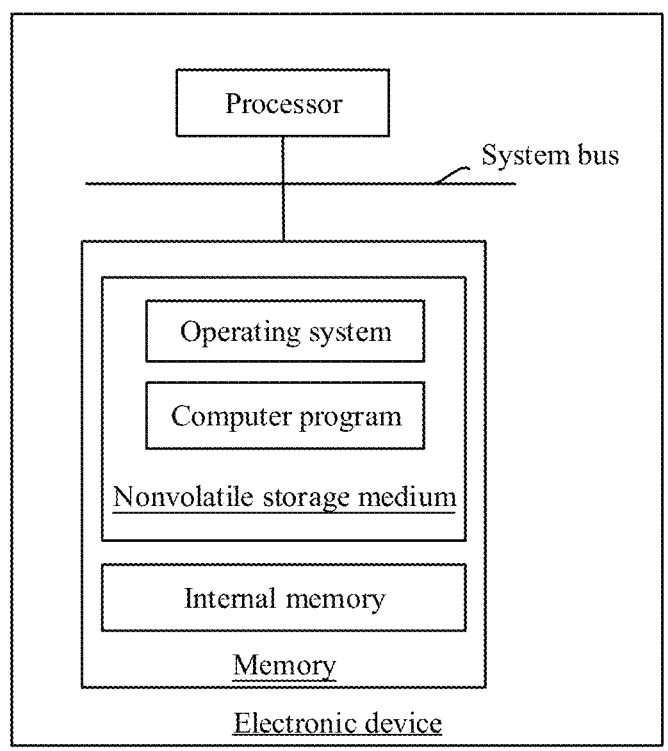
FIG. 1 is an internal structure diagram of an electronic device according to an embodiment.

FIG. 1 is an internal structure diagram of an electronic device according to an embodiment. As shown in FIG. 1, the electronic device includes a processor and memory which are connected through a system bus. The processor is configured to provide a calculation and control capability to support running of the whole electronic device. The memory includes a nonvolatile storage medium and an internal memory. The nonvolatile storage medium stores an operating system and a computer program. The computer program may be executed by the processor to implement an image coding method provided in each of the following embodiments. The internal memory provides a high-speed cache running environment for the operating system and computer program in the nonvolatile storage medium. The electronic device may be a mobile phone, a tablet computer, a personal digital assistant, a wearable device or the like. In some embodiments, the electronic device may also be a server. The server may be an independent server, and may also be implemented by a server cluster consisting of multiple servers.

Figure 2:
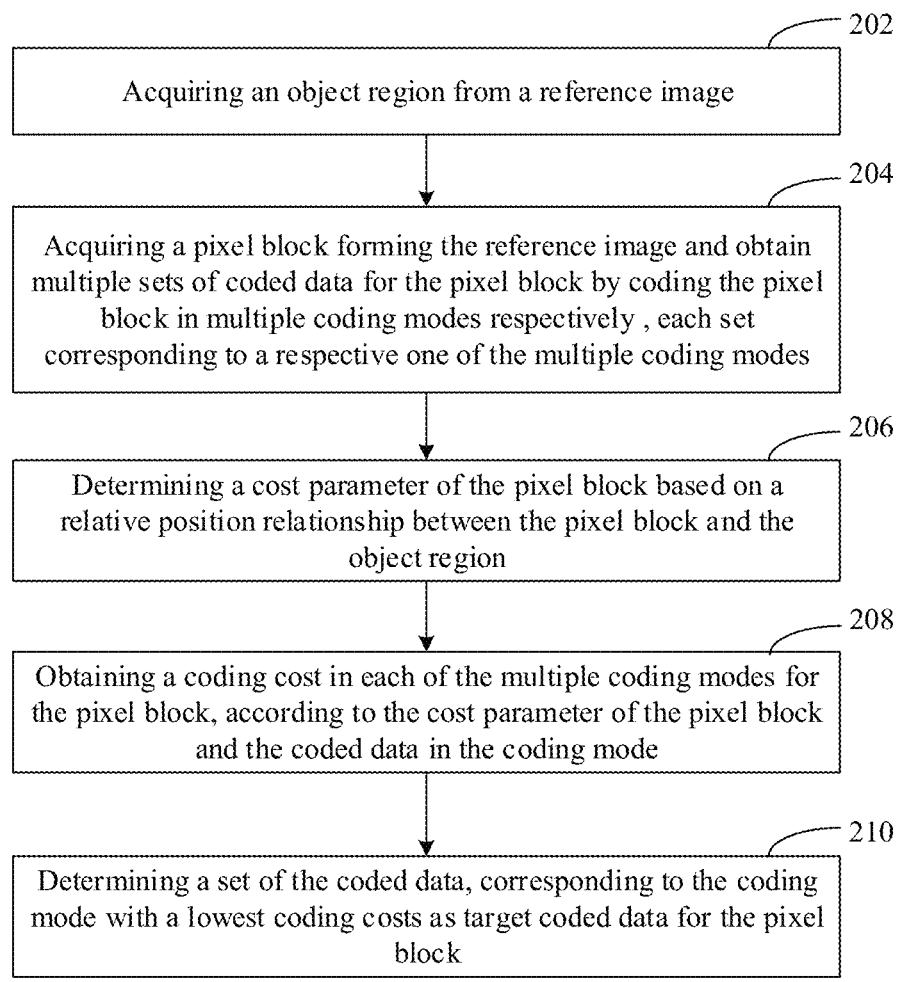
FIG. 2 is a flowchart of an image coding method according to an embodiment.

FIG. 2 is a flowchart of an image coding method according to an embodiment. The image coding method running in, for example, an electronic device in FIG. 1, in the embodiment is described. As shown in FIG. 2, the image coding method includes operations 202 to 210.

In 202, an object region is acquired from a reference image.

The reference image may be an image acquired by the electronic device through a camera, may also be an image stored in the electronic device, and may also be an image downloaded by the electronic device from a network, etc. The reference image is usually a frame of image in a video stream. The electronic device acquires the object region, in which the object is located, from the reference image. Specifically, the electronic device inputs the reference image into the object detection model, and may recognize the object in the reference image through the object detection model and segment the reference image according to the recognized object to obtain the object region in which the object is located. The object region in which the object is located is a minimum region including pixels corresponding to the object in the reference image. Specifically, when the object detection model outputs the object region in which the object is located through a rectangular box, correlation degrees of pixels in the object region and the pixels corresponding to the object are higher than correlation degrees of pixels in another rectangular region in the reference image and the pixels corresponding to the object; and when the object detection model outputs the object region in which the object is located through an object contour, edge pixels of the object region are edge pixels of the object contour, and in such case, the correlation degrees of the pixels in the object region and the pixels corresponding to the object are highest. Optionally, an object recognition network may be implemented through a deep leaning algorithm such as a Convolutional Neural Network (CNN), a Deep Neural Network (DNN) or a Recurrent Neural Network (RNN), etc.

In 204, a pixel block forming the reference image is acquired, and multiple sets of coded data for the pixel block are obtained by coding the pixel block in multiple coding modes, each set of the coded data corresponds to a coding mode of the multiple coding modes.

The pixel block is a pixel block obtained by dividing the reference image by the electronic device. The pixel block may include a macro block and a sub block. Specifically, the electronic device may divide the reference image into multiple macro blocks, and a macro block may further be divided into multiple sub blocks. Sizes of the macro block and the sub block may be set as required. For example, the size of the macro block may be 16*16, 8*8 and the like, and the size of the sub block may be 8*8, 8*4, 4*4 and the like.

The electronic device provides various coding modes for the pixel block. For example, for a 16*16 pixel block, the electronic device provides four coding modes, i.e. vertical prediction coding, horizontal prediction coding, direct current prediction coding and prediction coding based on a linear planar function obtained by fitting adjacent sample values. For a 4*4 or 8* pixel block, the electronic device provides nine different prediction coding modes, i.e. vertical prediction coding, horizontal prediction coding, direct current prediction coding, left lower diagonal prediction coding, right lower diagonal prediction coding, vertical-rightward prediction coding, horizontal-downward prediction coding, vertical-leftward prediction coding and horizontal-upward prediction coding.

The electronic device may acquire the multiple corresponding coding modes according to the size of the pixel block and code the pixel block in the multiple coding modes respectively, to obtain the multiple sets of coded data for the pixel block, each set of the coded data corresponds to a coding mode of the multiple coding modes.

In 206, a cost parameter of the pixel block is determined based on a relative position relationship between the pixel block and the object region.

The relative position relationship between the pixel block and the object region may include the following scenarios: the pixel block is in the object region, the pixel block partially overlaps the object region, the pixel block is outside the object region and the like. In some embodiments, the pixel blocks may also be distinguished according to a distance between each pixel block and the object region. The electronic device may preset cost parameters under different relative position relationships between the pixel block and the object region, thereby acquiring the corresponding cost parameter according to the relative position relationship between the pixel block and the object region. The electronic device may also regulate a preset cost parameter according to the relative position relationship between the pixel block and the object region to obtain the cost parameter of the pixel block.

An index used to evaluate image coding efficiency includes a distortion rate and a bit rate. The cost parameter may include a distortion weight value and a bit rate weight value. The electronic device determines the cost parameter of the pixel block according to the relative position relationship between the pixel block and the object region. Specifically, the electronic device may determine the cost parameter of the pixel block according to a position of an image detail required to be retained. For example, when a detail of the object region is required to be retained in the image, the electronic device may set the cost parameter of the pixel block in the object region such that the distortion weight value is higher than the bit rate weight value; and when a detail outside the object region is required to be retained in the image, the electronic device may also increase the distortion weight value and/or decrease the bit rate weight value in the cost parameter of the pixel block outside the object region.

In 208, a coding cost in each of the multiple coding modes for the pixel block, is obtained based on the cost parameter of the pixel block and the coded data in each coding mode.

In the embodiment of the application, the coding cost corresponding to each mode is described by taking a Rate Distortion Optimization (RDO) algorithm as an example. A calculation formula for the coding cost corresponding to the coding mode is J(mode)=A*SSD+B*R, where J(mode) is the coding cost corresponding to the coding mode, SSD is a difference mean square sum of a reconstructed block and a source image and may be understood as a distortion rate, A is the distortion weight value, R is a bit rate of the pixel block corresponding to the coding mode and B is the bit rate weight value. When the reference image is an intermediate frame in the video stream, intra-frame prediction and inter-frame prediction coding modes may be adopted for the pixel block, and the bit rate R may be the total bit number of a reference frame, the mode, a motion vector, a residual and the like; and when the reference image is a key frame in the video stream, the intra-frame prediction coding manner is adopted for the pixel block, and the bit rate R may be the total bit number of the mode, the residual and the like.

The electronic device may code the pixel block in the multiple coding modes respectively, to obtain the multiple sets of coded data for the pixel block, each set coded data corresponds to a coding mode of the multiple coding modes and the electronic device may calculate the distortion rate and bit rate of the coded pixel block according to the coded data, thereby obtaining the a coding cost in each of the multiple coding modes for the pixel block, according to the determined cost parameter and the cost calculation formula. Optionally, in some embodiments, the distortion rate may also be represented with an absolute error sum of a predicted block and the source image or an absolute coefficient sum obtained after Hardman transformation of a residual of the predicted block and the source image and will not be limited herein.

In 210, a set of coded data corresponding to the coding mode with a lowest coding cost is determined as target coded data for the pixel block.

The coding mode in which the coding cost is lowest is a coding mode in which the distortion rate is minimum under a certain bit rate. Specifically, if a compression rate corresponding to a coding mode is higher, the distortion rate is higher and the bit rate is lower; and on the contrary, if the compression rate is lower, the distortion rate is lower and the bit rate is higher. The electronic device codes the pixel block in the multiple coding modes respectively, and determines the one of the multiple sets of coded data, corresponding to a lowest one of the obtained coding costs, to be the target coded data for the pixel block.

In the embodiment of the application, an object region in which an object is located is recognized in a reference image, a cost parameter of a pixel block is determined according to a relative position relationship between the pixel block and the object region, the pixel block is coded in the multiple coding modes respectively, and a coding cost in each of the multiple coding modes for the pixel block is calculated according to the obtained coded data in the coding mode and a cost parameter, so that one of the multiple sets of coded data, corresponding to a lowest one of the obtained coding costs, is determined to be the target coded data for the pixel block. Since the cost parameter of the pixel block may be determined according to the relative position relationship between the pixel block and the object region, that is, the distortion weight value or bit rate weight value of the pixel block may be dynamically regulated, image details of the object region or outside the object region may be selectively retained, and an image coding processing effect may be improved.

Figure 3:
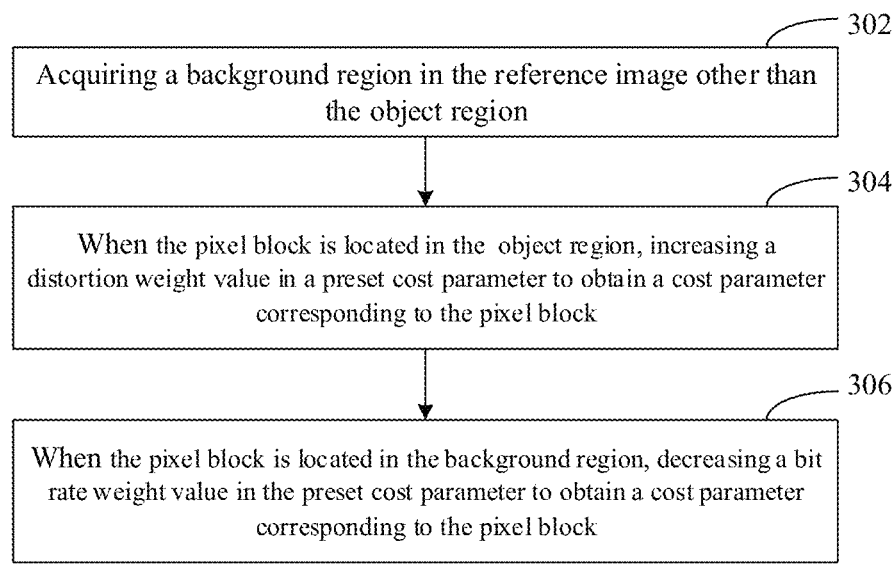
FIG. 3 is a flowchart of determining a cost parameter of a pixel block according to an embodiment.

As shown in FIG. 3, in an embodiment, the operation in the image coding method that the cost parameter of the pixel block is determined based on the relative position relationship between the pixel block and the object region may include the following operations.

In 302, a background region in the reference image other than the object region is acquired.

The background region refers to a region in the reference image other than the object region. The electronic device may acquire the background region in the reference image other than the object region.

In 304, when the pixel block is located in the object region, a distortion weight value in a preset cost parameter is increased to obtain a cost parameter corresponding to the pixel block.

In 306, when the pixel block is located in the background region, a bit rate weight value in the preset cost parameter is decreased to obtain a cost parameter corresponding to the pixel block.

When all pixels in the pixel block are in the object region, the pixel block is located in the object region. When all the pixels in the pixel block are not in the object region (namely all in the background region), the pixel block is located in the background region. When the pixels in the pixel block are partially in the object region and partially in the background region, the electronic device may divide the pixel block according to a practical application requirement. For example, the electronic device, when the pixels of the pixel block are partially in the object region, may consider that the pixel block is located in the object region; and the electronic device may also determine the region that the pixel block is located in according to the numbers of the pixels of the pixel blocks in different regions, for example, when the number of the pixels of the pixel block in the object region is smaller than the number of the pixels in the background region, it is determined that the pixel block is located in the background region. There are no limits made herein.

The preset cost parameter includes the distortion weight value and the bit rate weight value, and the preset cost parameter is obtained according to experimental data. Specifically, different prediction modes or different cost calculation manners may correspond to different preset cost parameters. The distortion weight value is a coefficient used to correct the distortion rate in the calculation formula for the coding cost, and the coding rate weight value is a coefficient used to correct the code rate in the calculation formula for the coding cost.

The electronic device, when the pixel block is located in the object region, may increase the distortion weight value in the preset cost parameter to obtain the cost parameter corresponding to the pixel block and, when the pixel block is located in the background region, decrease the bit rate weight value in the preset cost parameter to obtain the cost parameter corresponding to the pixel block. A specific regulation amplitude may be set according to the practical application requirement and will not be limited herein. If the electronic device increases the distortion weight value of the pixel block located in the object region, more details of the pixel block are retained in an image block restored according to the target coded data corresponding to the lowest coding cost, and the difference between the image block and the pixel block is less. If the bit rate weight value of the pixel block located in the background region is decreased, a compression rate for the background region may be increased. Therefore, coding the image by use of the image coding method may increase the compression rate for the background region, meanwhile, retain image information of the object region, so that the image coding processing effect is optimized.

In an embodiment, the image coding method may further include the following operations: padding processing is performed on the object region to obtain a transition region; and when the pixel block is located in the transition region, the preset cost parameter is determined to be a cost parameter corresponding to the pixel block.

Padding processing refers to a boundary filling operation over a partial region in the image. Specifically, the electronic device may perform padding processing on the object region by use of a padding algorithm to obtain a padded region. The padded region includes an object region and a transition region. The transition region is a region in the padded region other than the object region. In such case, the background region is a region in the reference image other than the object region and the transition region.

Figure 4:
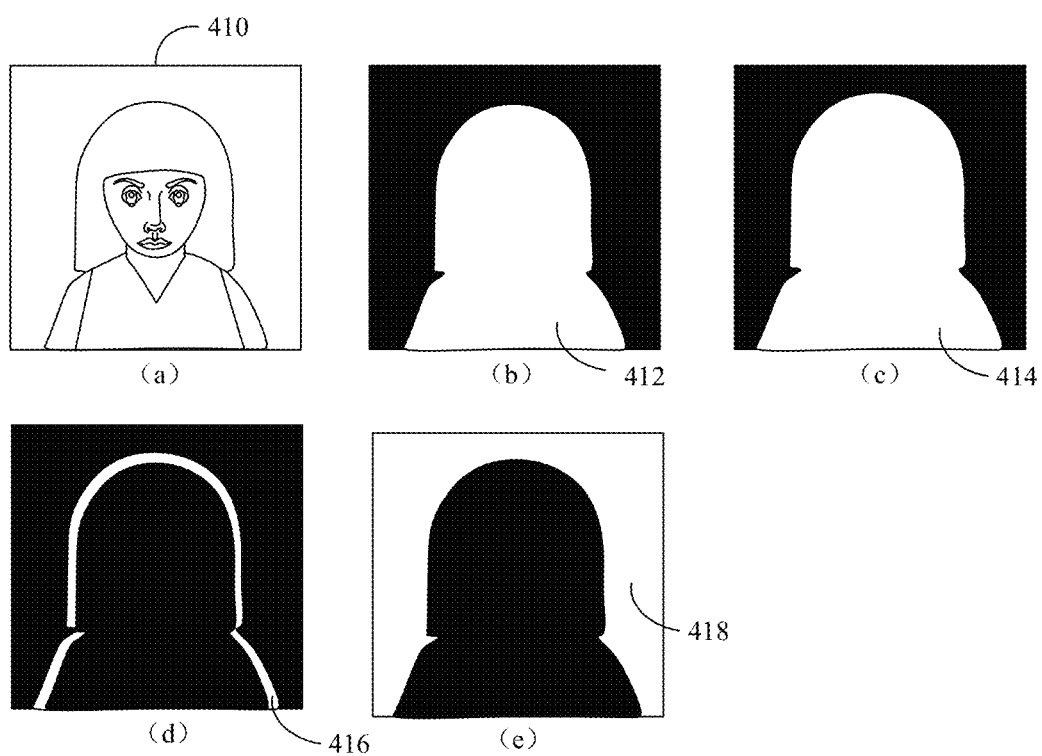
FIG. 4 is a schematic diagram of a reference image according to an embodiment.
Figure 5:
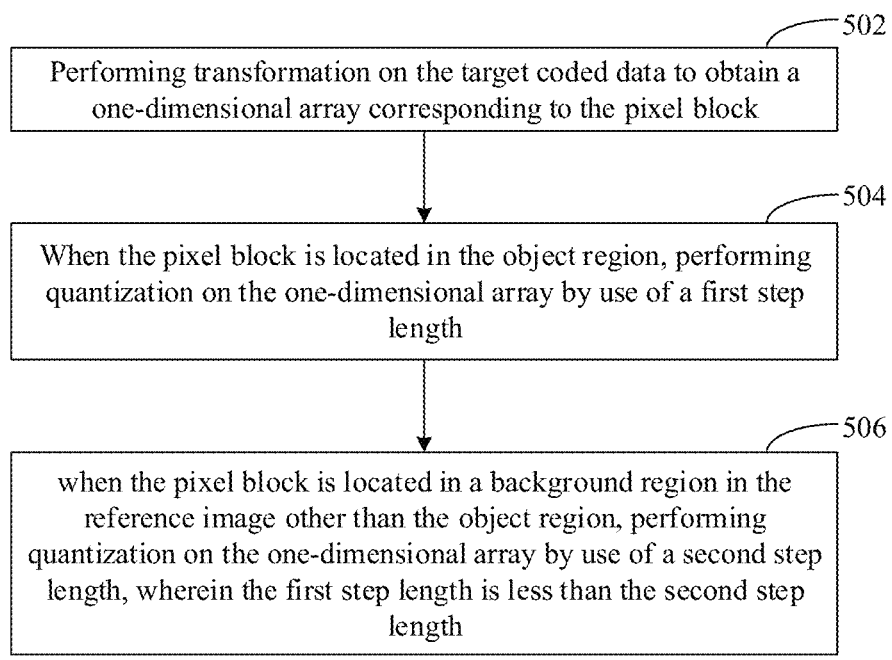
FIG. 5 is a flowchart of quantization according to an embodiment.
Figure 6:
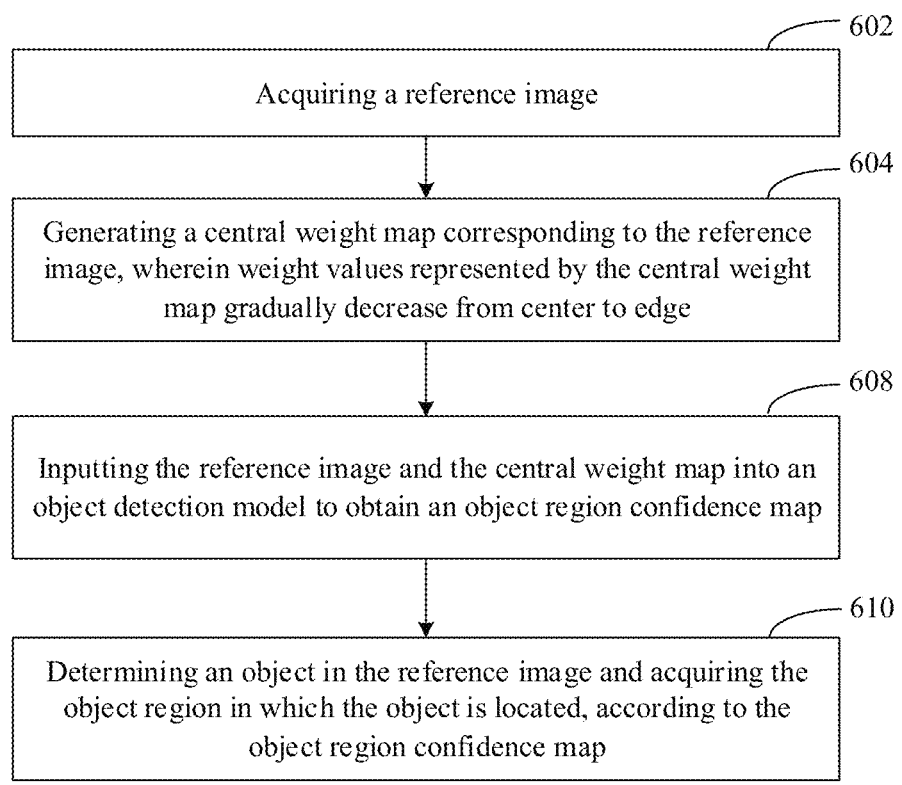
FIG. 6 is a flowchart of performing object detection on an image according to an embodiment.
Figure 7:
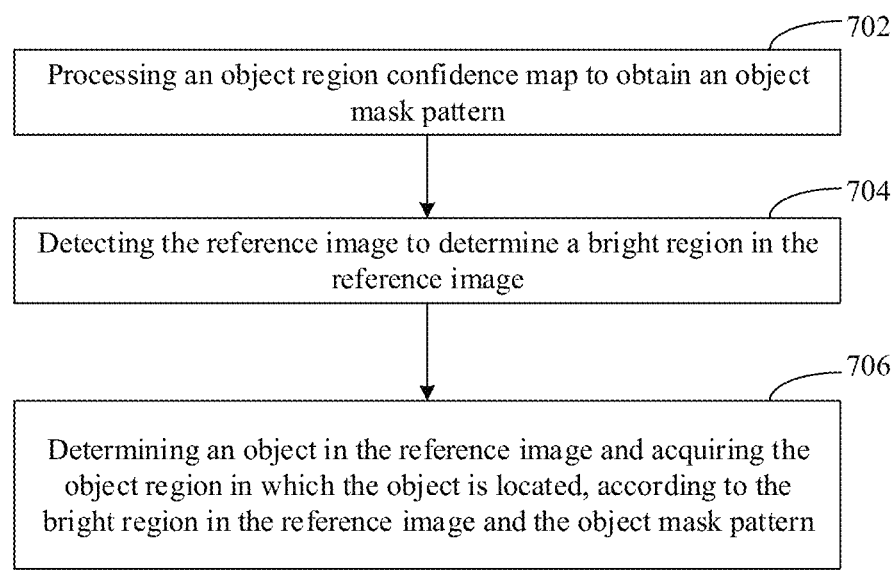
FIG. 7 is a flowchart of processing an object region confidence map according to an embodiment.

FIG. 4 is a schematic diagram of a reference image according to an embodiment. As shown in FIG. 4, the electronic device performs object detection on the reference image 410 to obtain the object region 412 in which the object is located and then performs padding processing on the object region 412, the padded region 414 includes the object region 412 and the transition region 416, and the background region 418 is a region in the reference image 410 other than the object region 412 and the transition region 416.

When the pixel block is located in the transition region, the electronic device may determine the preset cost parameter to be a cost parameter of the pixel block. For example, the distortion weight value in the preset cost parameter is 1, and the bit rate weight value is 0.7. In such case, if both regulation amplitudes are 0.2, when the pixel block is located in the object region, the distortion weight value is 1.2, and the bit rate weight value is 0.7; when the pixel block is located in the transition region, the distortion weight value is 1, and the bit rate weight value is 0.7; and when the pixel block is located in the background region other than the object region and the transition region, the distortion weight value is 1, and the bit rate weight value is 0.5.

The reference image is divided into the object region, the transition region and the background region, and the coded data corresponding to each of the multiple coding modes is calculated according to the cost parameter, determined according to the region in which the pixel block is located, of the pixel block, so that the compression rate of the background region may be increased, and meanwhile, the image information of the object region is retained. For the transition region, the preset cost parameter is determined to be the cost parameter, so that smooth transition between the object region and background region in the restored image may be ensured, and a better image effect is achieved.

In an embodiment, before the operation that the pixel block in the reference image is acquired, the image coding method may further include the following operations: a background region in the reference image other than the object region is acquired; and the object region is divided into multiple first pixel blocks of a first size, and the background region is divided into multiple second pixel blocks of a second size, the first size is smaller than the second size.

The first size and the second size may specifically be set according to the practical application requirement. For example, when the first size is 8*8 or 4*4, the second size may be 16*16; and when the first size is 4*4, the second size may be 8*8. Of course, in some embodiments, the divided sizes are also not limited to 16*16, 8*8 and 4*4. For example, the first size may also be 8*8, and the second size may be 16*8. The electronic device may divide the object region in the reference image into the multiple pixel blocks in the first size and divide the background region into the multiple pixel blocks in the second size. Optionally, the reference image may further include the transition region, and the electronic device may divide the transition region of the reference image into multiple pixel blocks in a third size, the third size is more than or equal to the first size and less than or equal to the second size.

In an embodiment, after the operation that the one of the multiple sets of coded data, corresponding to a lowest one of the obtained coding costs, is determined to be the target coded data for the pixel block, the mage coding method further includes the following operations.

In 502, transformation is performed on the target coded data to obtain a one-dimensional array corresponding to the pixel block.

The transformation includes Discrete Cosine Transform (DCT) and ZIGZAG scan transformation. The electronic device performs transformation on the target coded data. Specifically, the electronic device may perform DCT on the target coded data to obtain a transformed matrix, and may further perform ZIGZAG transformation on the transformed matrix to obtain the one-dimensional array corresponding to the pixel block. Low-frequency components of the pixel block subjected to DCT are concentrated in a left upper corner of the matrix, and one-dimensional data obtained by ZIGZAG transformation is an array in which data is usually arranged from large to small.

In 504, when the pixel block is located in the object region, quantization is performed on the one-dimensional array by use of a first step length.

In 506, when the pixel block is located in a background region in the reference image other than the object region, quantization is performed on the one-dimensional array by use of a second step length, the first step length is less than the second step length.

Quantization refers to a process of approximating continuous values (or numerous possible discrete values) of a signal to finitely multiple (or relatively small) discrete values. By quantization, at least one of spatial redundant information and time redundant information of the image may be removed. For example, when the one-dimensional array is [31, 22, 18, 7, 5, 3, 1, 0.5], if a quantization step length is 5, a quantization result is [6, 4, 4, 1, 1, 1, 0, 0]; and if the quantization step length is 3, the quantization result is [10, 7, 6, 2, 2, 1, 0, 0]. If the quantization step length is smaller, coding loss is less, and the compression rate is lower; and on the contrary, if the quantization step length is larger, the coding loss and the compression rate are also higher.

The first step length is less than the second step length. Specific numerical values of the first step length and the second step length may be set according to the practical application requirement and will not be limited herein. When the pixel block is located in the object region, the electronic device may perform quantization on the one-dimensional array corresponding to the pixel block by use of the first step length that is relatively small, thereby reducing the coding loss of the object region. When the pixel block is located in the background region, quantization may be performed on the one-dimensional array corresponding to the pixel block by use of the second step length that is relatively large, so that the compression rate for the image may be increased. Since the background region of the image is usually a region that is less interested and has a relatively high similarity, adopting different quantization step lengths for quantization of the background region and the object region may ensure the compression rate for the image, meanwhile, improve the image coding processing effect and achieve a better effect of the image restored after decoding. Optionally, the reference image may further include the transition region. Optionally, the electronic device quantizes the one-dimensional array of the pixel block located in the transition region by use of a third step length, the third step length is more than or equal to the first step length and less than or equal to the second step length. The image coding processing effect may further be improved.

In an embodiment, the reference image is a key frame image in the video stream, and before the operation that the object region in which the object is located is acquired from the reference image, the image coding method further includes the following operations: each frame image is sequentially acquired from the video stream and an object region in which the object is located is and recognized in the frame image; and if an object region in a present frame image is mismatched with an object region in a previous key frame image, the present frame image is determined to be the reference image.

Key frames in a video stream are usually acquired in a fixed-interval extraction manner, namely a frame image is acquired as a key frame image at an interval of a fixed frame number; or another frame image is selected as a key frame image when a picture of the image in the video stream changes greatly.

In the embodiment of the application, the electronic device may sequentially acquire each frame image in the video stream and recognize the object region in which the object is located in the frame image in a coding process of the video stream. There may be one or more object regions in a frame image. The electronic device may compare the acquired object region in the present frame image and the object region in the previous key frame image and, if the object region in the present frame image is mismatched with the object region in the previous key frame image, determine the present frame image to be the reference image.

Specifically, the electronic device may compare the object region in the present frame image and the object region in the previous key frame image to obtain a matching degree between the object region in the present frame image and the object region in the previous key frame image, and may compare the matching degree and a preset matching degree to determine whether the object region in the present frame image is matched with the object region in the previous key frame image. A compared attribute includes the number of the object region and the size of the object region, and may optionally further include a position of the object region in the image and the like. There are no limits made herein.

Optionally, the electronic device may select the key frame by combining fixed frame and object recognition manners. Specifically, the electronic device, when the object regions in a preset number of continuous frame images are all matched, may determine a next frame image to be a key frame image and, when an object region in the preset number of continuous frame images is mismatched with the object region in the previous key frame image, may determine the first mismatched frame image in the preset number of continuous frame images to be a key frame image and reacquire a preset number of continuous frame images to determine a next key frame image.

Object detection is performed on each frame image in the video stream, and if the object region in the present frame image is mismatched with the object region in the previous key frame image, the present frame image is determined to be the key frame image for image coding processing. In such a manner, selection of key frames may be dynamically regulated, and bit rate allocation for video coding may be optimized.

In an embodiment, the operation in the image coding method that the object region is acquired from the reference image includes the following actions.

In 602, the reference image is acquired.

In 604, a central weight map corresponding to the reference image is generated, weight values represented by the central weight map gradually decrease from center to edge.

The central weight map refers to a map configured to record the weight value of each pixel in the reference image. The weight values recorded in the central weight map gradually decrease from the center to four edges, namely a central weight is maximum and weights gradually decrease from the center to the four edges. The central weight map represents that the weight values gradually decrease from a central image pixel to edge pixels of the reference image.

The electronic device may generate the corresponding central weight map according to the size of the reference image. The weight values represented by the central weight map gradually decrease from the center to the four edges. The central weight map may be generated by use of a Gaussian function, or a first-order equation or a second-order equation. The Gaussian function may be a two-dimensional Gaussian function.

In 606, the reference image and the central weight map are input into an object detection model to obtain an object region confidence map.

The object detection model is a model trained in advance according to a sample image, central weight map and corresponding labeled object mask pattern of the same scenario. Specifically, the electronic device may acquire a large amount of training data in advance and input the training data into an object detection model including an initial network weight for training to obtain the object detection model. Each set of training data includes a sample image, central weight map and labeled object mask pattern corresponding to the same scenario. The sample image and the central weight map are determined as input of the trained object detection model, and the labeled object mask pattern is determined as a ground truth expected to be output by the trained object detection model. The object mask pattern is an image filter template configured to recognize the object in the image, and may shield remaining part of the image and screen the object in the image. The object detection model may be trained to recognize and detect various objects such as a person, a flower, a cat and a dog.

Specifically, the electronic device may input the reference image and the central weight map into the object detection model and perform detection to obtain the object region confidence map. The object region confidence map includes confidence values that each pixel belongs to different categories of objects. For example, a confidence that a pixel belongs to a person is 0.8, a confidence that it belongs to a flower is 0.1 and a confidence that it belongs to a dot is 0.1.

In 608, the object in the reference image is determined and the object region in which the object is located is acquired, according to the object region confidence map.

The object may be various objects, for example, a person, a flower, a cat, a dot, cattle, a cloud, etc. The electronic device may determine each object in the reference image and an object region in which the object is located according to magnitudes of the confidence values that each pixel belongs to different categories of objects in the object region confidence map.

Specifically, the electronic device may filter the object region confidence map based on an adaptive threshold value to remove the pixels that have relatively low confidence values and/or scattered in the object region confidence map. The electronic device may also perform one or more of processing of filtering, padding or erosion on the object region confidence map to obtain an object region confidence map with a fine edge. Therefore, the electronic device may output the object regions where multiple objects are located in the reference image according to the processed object region confidence region, and object detection accuracy may be improved.

The central weight map corresponding to the reference image is generated, the reference image and the central weight map may be input into the corresponding object detection model to obtain the object region confidence map, and the object and object region where it is located in the reference image may be determined according to the object region confidence map, so that an object in a center of the image may be detected more easily by use of the central weight map, and the object in the reference image may be recognized more accurately.

In an embodiment, the operation in the image coding method that the object in the reference image is determined and the object region in which the object is located is acquired, according to the object region confidence map includes the following operations.

In 702, the object region confidence map is processed to obtain an object mask pattern. Specifically, some pixels with relatively low confidences are scattered in the object region confidence map, and the electronic device may perform filtering processing on the object region confidence map to obtain the object mask pattern. Filtering processing may be implemented by configuring a confidence threshold value and filtering the pixels of which the confidence values are lower than the confidence threshold value in the object region confidence map. The confidence threshold value may be an adaptive confidence threshold value, and may also be a fixed threshold value, or a threshold value configured for a specific region. The adaptive confidence threshold value may be a local-adaptive confidence threshold value. The local-adaptive confidence threshold value is a binary confidence threshold value, determined according to a pixel value distribution of a region block where a pixel is located, for a region where the pixel is located. A binary confidence threshold value of an image region with relatively high brightness is configured to be relatively high, and a binary confidence threshold value of an image region with relatively low brightness is configured to be relatively low.

Optionally, the electronic device may further perform filtering processing on the object region confidence map based on the adaptive confidence threshold value to obtain a binary mask pattern and perform morphologic processing and guided filtering processing on the binary mask pattern to obtain the object mask pattern. Specifically, the electronic device, after performing filtering processing on the object region confidence map according to the adaptive confidence threshold value, represents the confidence value of a retained pixel with 1 and represents the confidence value of a removed pixel with 0, to obtain the binary mask pattern. Morphologic processing may include erosion and padding. An erosion operation may be executed on the binary mask pattern at first, and then a padding operation is executed to remove a noise. Then, guided filtering processing is performed on the binary mask pattern subjected to morphologic processing to implement an edge filtering operation to obtain an object mask pattern of which an edge is extracted. By morphologic processing and guided filtering processing, it may be ensured that the obtained object mask pattern has few noisy points or has no noisy points and its edge is softer.

In 704, the reference image is detected to determine a bright region in the reference image.

The bright region refers to a region of which a brightness value is greater than a brightness threshold value.

Specifically, the electronic device performs bright detection on the reference image to screen a target pixel of which a brightness value is greater than the brightness threshold value and performs connected domain processing on the target pixel to obtain the bright region.

In 706, the object in the reference image is determined and the object region in which the object is located is acquired, according to the bright region in the reference image and the object mask pattern.

Specifically, the electronic device may perform difference calculation or logic AND calculation on the bright region in the reference image and the object mask pattern to obtain the object region corresponding to the object of which bright is eliminated in the reference image. The electronic device performs differential processing on the bright region in the reference image and the object mask pattern, namely subtracting the corresponding pixels in the reference image and the object mask pattern, to obtain the object region, in which the object is located, from the reference image.

Filtering processing is performed on the object region confidence map to obtain the object mask pattern, so that reliability of the object region confidence map is improved. The reference image is detected to obtain the bright region for processing with the object mask pattern to obtain the object region where the object of which the bright is eliminated is located. Bright and high-brightness regions influencing object recognition precision are processed by use of an independent filter, so that the object recognition precision and accuracy are improved.

Figure 8:
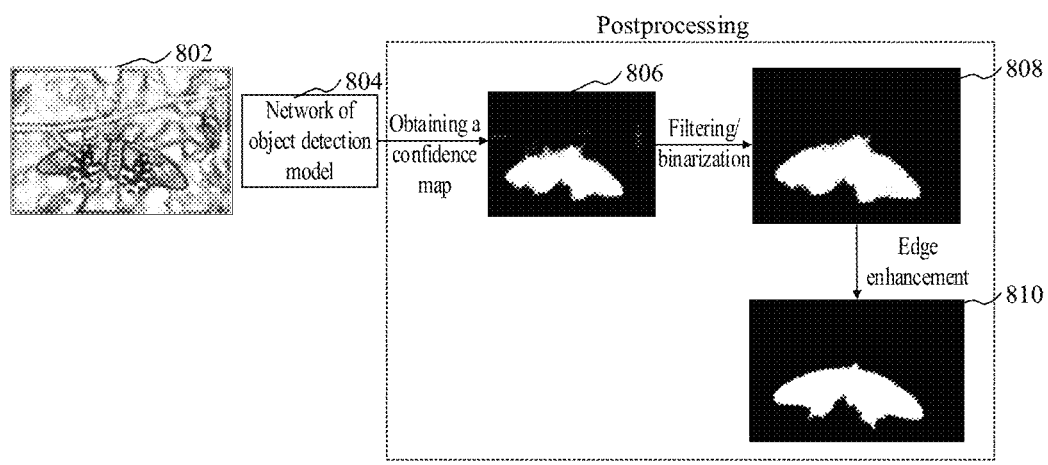
FIG. 8 is a schematic diagram of an image detection effect according to an embodiment.
Figure 9:
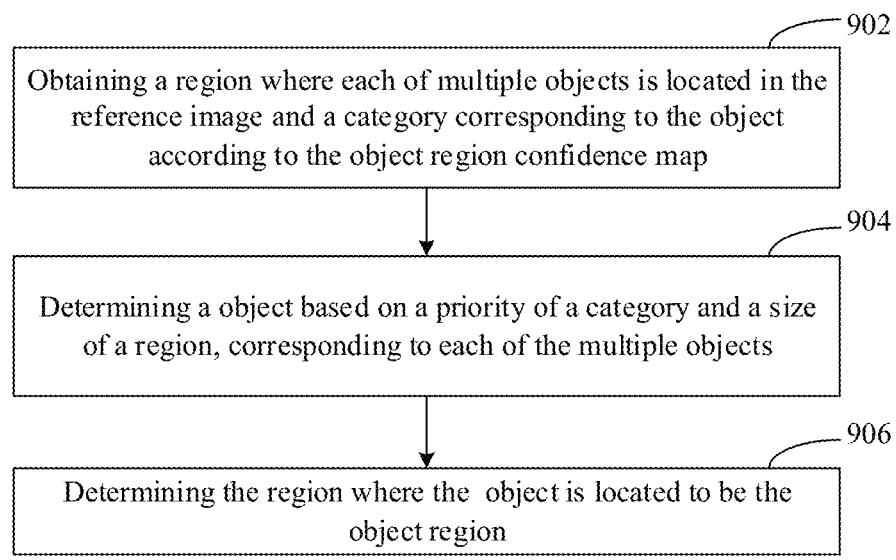
FIG. 9 is a flowchart of obtaining an object region where an object is located according to an object region confidence map according to an embodiment.

FIG. 8 is a schematic diagram of an image processing effect according to an embodiment. As shown in FIG. 8, there is a butterfly in a reference image 802, the reference image 802 is input into an object detection model to obtain an object region confidence map 806, then the object region confidence map 806 is filtered and binarized to obtain a binary mask pattern 808, and morphologic processing and guided filtering processing are performed on the binary mask pattern 808 to implement edge enhancement to obtain a object mask pattern 810.

In an embodiment, the operation in the image coding method that the object in the reference image is determined and the object region in which the object is located is acquired, according to the object region confidence map includes the following operations.

In 902, a region where each of multiple objects is located in the reference image and a category corresponding to the object is obtained according to the object region confidence map.

In 904, an object is determined based on a priority of a category and a size of the region, corresponding to each of the multiple object.

The electronic device may preset priorities corresponding to different categories. For example, priorities of categories corresponding respectively to person, flower, cat, dog, cattle and cloud sequentially decrease. The electronic device determines the object based on a priority of a category and a size of a region, corresponding to each object. Specifically, when there are multiple objects belonging to the same category in the reference image, the electronic device may determine an object corresponding to a largest region to be the object according to sizes of regions corresponding to the multiple objects; and when there are multiple objects belonging to different categories in the reference image, the electronic device may determine an object corresponding to the category with a highest priority to be the object, and if there are multiple objects with the highest priority in the reference image, the electronic device may further determine a target region according to sizes of regions where the multiple objects are located. Optionally, the electronic device also determines the object in combination with a position of the region of each object in the image. For example, the electronic device may also preset score values for the priorities of different categories, the sizes of different regions and the regions at different positions in the image to calculate a score value of each object according to the priority of the category, the size of the region and the position of the region in the image, corresponding to the object, and determine an object with the highest score value to be the object.

In 906, a region where the object is located is determined to be the object region.

The electronic device, after determining the object, determines the region where the object is located to be the object region.

An object is determined based on the priority of the category and the size of the region, corresponding to each object, and the region where the object is located is determined to be the object region, so that object recognition accuracy may be improved.

Figure 10:
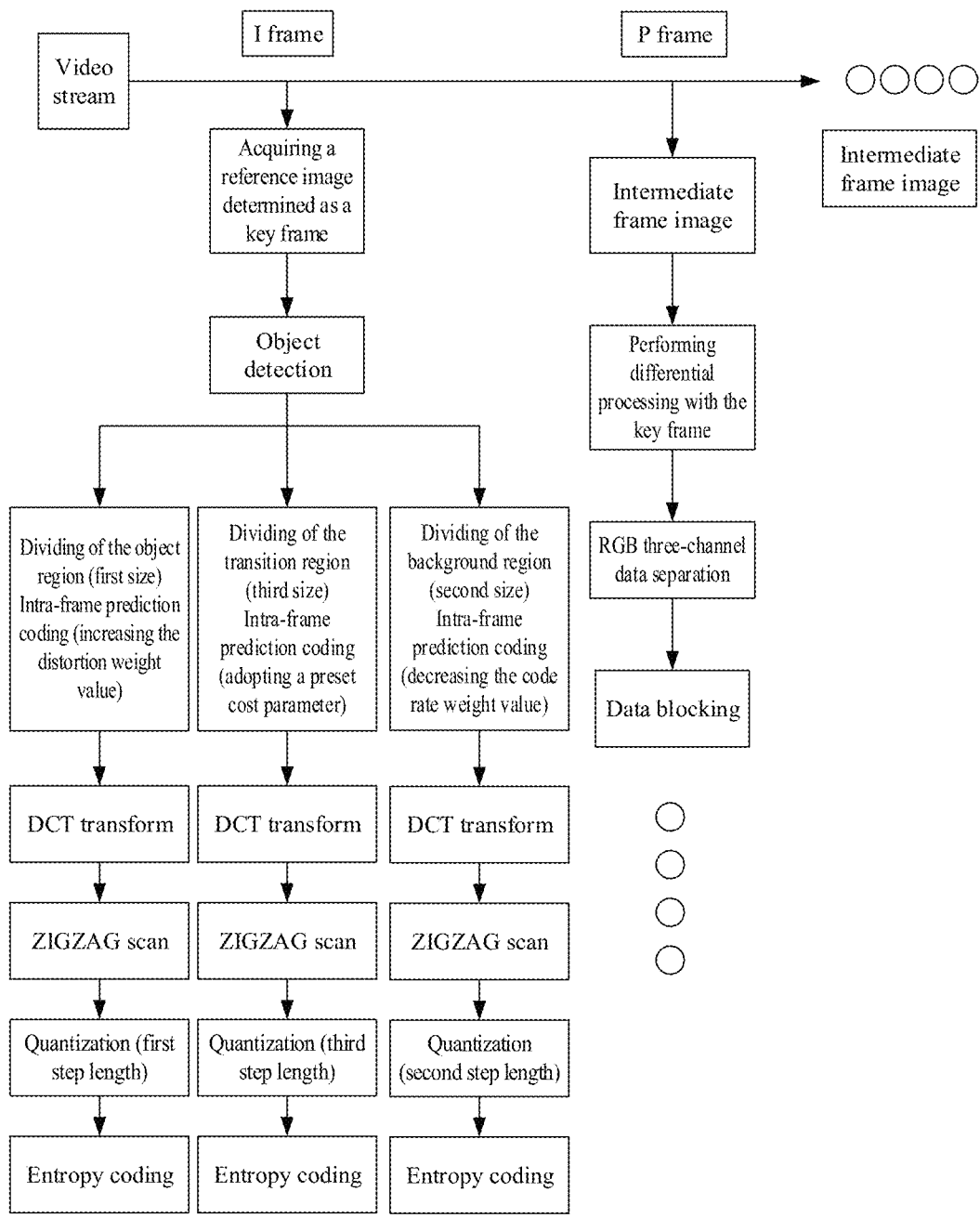
FIG. 10 is a flowchart of an image coding method according to an embodiment.

FIG. 10 is a flowchart of an image coding method according to an embodiment. As shown in FIG. 10, in an embodiment, the image coding method is implemented by a process including the following actions.

At first, an electronic device acquires a reference image determined to be a key frame image in a video stream and performs object recognition on the reference image to obtain an object region, in which an object is located, from the reference image.

Optionally, the electronic device generates a central weight map corresponding to the reference image, weight values represented by the central weight map gradually decrease from center to edge, inputs the reference image and the central weight map into an object detection model to obtain an object region confidence map, determines the object in the reference image and acquires the object region in which the object is located, according to the object region confidence map.

Optionally, the electronic device processes the object region confidence map to obtain a object mask pattern, detects the reference image to determine a bright region in the reference image, determines the object in the reference image and acquires the object region in which the object is located, according to the bright region in the reference image and the object mask pattern.

Optionally, the electronic device obtains a region where each of multiple objects in the reference image is located and a category corresponding to the object according to the object region confidence map, determines an object based on a priority of a category and a size of a region corresponding to each of the multiple objects and determines a region where the object is located to be the object region.

Optionally, the electronic device performs padding processing on the object region in the reference image to obtain a transition region and determines a region in the reference image other than the object region and the transition region, to be a background region.

Then, the electronic device divides the reference image into multiple pixel blocks.

Optionally, the object region is divided into multiple first pixel blocks of a first size, the background region is divided into multiple second pixel blocks of a second size, and the transition region is divided into multiple third pixel blocks in a third size, the first size is smaller than the second size and the third size is more than or equal to the first size and less than or equal to the second size.

Next, the electronic device performs intra-frame prediction coding processing on each of the divided multiple pixel blocks. Specifically, the electronic device codes each of the pixel blocks in multiple coding modes respectively, to obtain multiple sets of coded data for the pixel block, each set corresponding to a respective one of the multiple coding modes.

Later on, a cost parameter of each of pixel blocks is determined based on a relative position relationship between the pixel block and the object region, a coding cost in each of the multiple coding modes for the pixel block is obtained according to the cost parameter of the pixel block and the coded data in the coding mode, and one of the multiple sets of coded data, corresponding to a lowest one of the obtained coding costs, is determined to be target coded data for the pixel block.

Optionally, when the pixel block is located in the object region, a distortion weight value in a preset cost parameter is increased to obtain a cost parameter corresponding to the pixel block; when the pixel block is located in the background region, a bit rate weight value in the preset cost parameter is decreased to obtain a cost parameter corresponding to the pixel block; and when the pixel block is located in the transition region, the preset cost parameter is determined to be a cost parameter corresponding to the pixel block.

Then, the electronic device performs DCT processing and ZIGZAG scan processing on the target coded data to obtain a one-dimensional array corresponding to the pixel block.

Then, quantization is performed on the one-dimensional array of the pixel block by use of different quantization step lengths according to the relative position relationship between the pixel block and the object region. Specifically, when the pixel block is located in the object region, quantization is performed on the one-dimensional array by use of a first step length; when the pixel block is located in the background region, quantization is performed on the one-dimensional array by use of a second step length; and when the pixel block is located in the transition region, quantization is performed on the one-dimensional array by use of a third step length, the first step length is less than the second step length and the third step length is more than or equal to the first step length and less than or equal to the second step length.

Optionally, after quantization, the electronic device may further perform entropy coding processing on the pixel block to obtain final coded data. By entropy coding processing, statistical redundant information of the pixel block may be removed.

Optionally, the electronic device sequentially acquires each frame image in the video stream and recognizes an object region, in which an object is located, in the frame image and, if an object region in a present frame image is mismatched with an object region in a previous key frame image, determines the present frame image to be a key frame image.

Furthermore, the electronic device may sequentially acquire intermediate frame images in the video stream and perform coding processing on the intermediate frame images. Coding processing may also be performed on the intermediate frame images by use of the abovementioned image coding method.

It is to be understood that, although each step in the flowcharts of FIGS. 2, 3, 5, 6, 7 and 9 is sequentially presented according to indications of arrowheads, these actions are not always executed according to sequences indicated by the arrowheads. Unless otherwise clearly described in the invention, there are no strict limits made to execution sequences of these actions and these actions may be executed in other sequences. Moreover, at least part of actions in FIGS. 2, 3, 5, 6, 7 and 9 may include multiple sub-actions or multiple stages, these sub-actions or stages are not always executed and completed at the same time but may be executed at different times, and these sub-actions or stages are not always sequentially executed but may be executed in turn or alternately with at least part of other actions or sub-actions or stages of the other actions.

Figure 11:
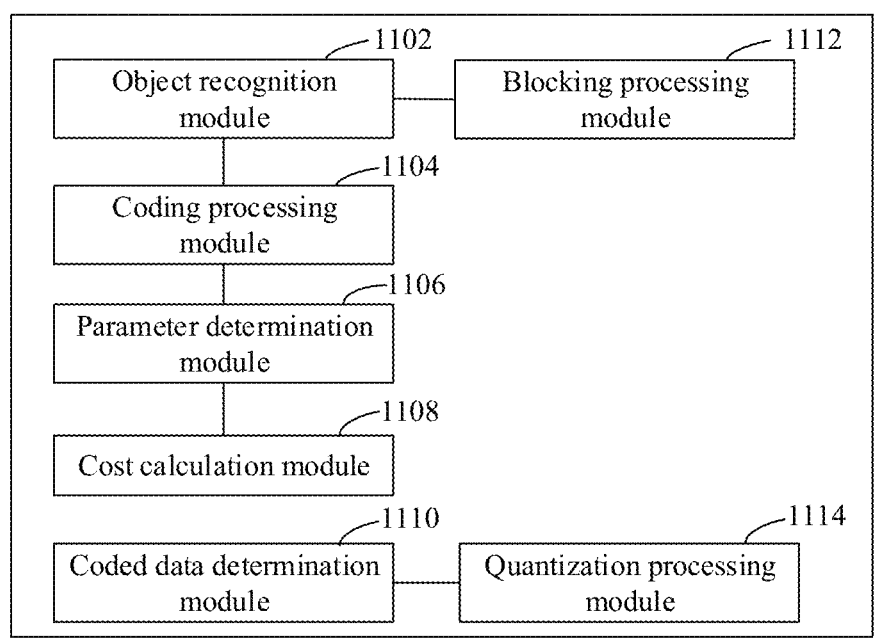
FIG. 11 is a structure block diagram of an image coding apparatus according to an embodiment.

FIG. 11 is a structure block diagram of an image coding apparatus according to an embodiment. As shown in FIG. 11, the image coding apparatus includes an object recognition module 1102, a coding processing module 1104, a parameter determination module 1106, a cost calculation module 1108 and a coded data determination module 1110.

The object recognition module 1102 is configured to acquire an object region from a reference image.

The coding processing module 1104 is configured to acquire a pixel block forming the reference image and obtain multiple sets of coded data for the pixel block by coding the pixel block in multiple coding modes respectively, each set of the coded data corresponds to a coding mode of the multiple coding modes.

The parameter determination module 1106 is configured to determine a cost parameter of the pixel block based on a relative position relationship between the pixel block and the object region.

The cost calculation module 1108 is configured to obtain a coding cost in each of the multiple coding modes for the pixel block based on the cost parameter of the pixel block and the coded data in each coding mode.

The coded data determination module 1110 is configured to determine a set of coded data corresponding to the coding mode with a lowest coding cost as target coded data for the pixel block.

According to the image coding apparatus provided in the embodiment of the application, the cost parameter of the pixel block may be determined according to the relative position relationship between the pixel block and the object region, that is, a distortion weight value or bit rate weight value of the pixel block may be dynamically regulated, so that image details of the object region or outside the object region may be selectively retained, and an image coding processing effect may be improved.

In an embodiment, the parameter determination module 1106 may further be configured to acquire a background region in the reference image other than the object region, when the pixel block is located in the object region, increase a distortion weight value in a preset cost parameter to obtain a cost parameter corresponding to the pixel block and, when the pixel block is located in the background region, decrease a bit rate weight value in the preset cost parameter to obtain a cost parameter corresponding to the pixel block.

In an embodiment, the parameter determination module 1106 may further be configured to perform padding processing on the object region to obtain a transition region and, when the pixel block is located in the transition region, determine the preset cost parameter to be a cost parameter corresponding to the pixel block.

In an embodiment, the image coding apparatus may further include a blocking processing module 1112, and the blocking processing module 1112 is configured to acquire a background region in the reference image other than the object region, divide the object region into multiple first pixel blocks of a first size and divide the background region into multiple second pixel blocks of a second size, the first size is smaller than the second size.

In an embodiment, the image coding apparatus may further include a quantization module 1114, and the quantization module 1114 is configured to perform transformation on the target coded data to obtain a one-dimensional array corresponding to the pixel block, when the pixel block is located in the object region, perform quantization on the one-dimensional array by use of a first step length and, when the pixel block is located in the background region in the reference image other than the object region, perform quantization on the one-dimensional array by use of a second step length, the first step length is less than the second step length.

In an embodiment, the object recognition module 1102 may further be configured to sequentially acquire each frame image in the video stream and recognize an object region, in which an object is located, in the frame image and, if an object region in a present frame image is mismatched with an object region in a previous key frame image, determine the present frame image to be the reference image.

In an embodiment, the object recognition module 1102 may further be configured to acquire the reference image, generate a central weight map corresponding to the reference image, weight values represented by the central weight map gradually decrease from center to edge, input the reference image and the central weight map into an object detection model to obtain an object region confidence map, determine the object in the reference image and acquire the object region in which the object is located according to the object region confidence map.

In an embodiment, the object recognition module 1102 may further be configured to process the object region confidence map to obtain an object mask pattern, detect the reference image to determine a bright region in the reference image, determine the object in the reference image and acquire the object region in which the object is located, according to the bright region in the reference image and the object mask pattern.

In an embodiment, the object recognition module 1102 may further be configured to obtain a region where each of multiple objects in the reference image is located and a category corresponding to the object according to the object region confidence map, determine an object based on a priority of a category and a size of a region, corresponding to each of the multiple object and determine a region where the object is located to be the object region.

Division of each module in the image coding apparatus is only adopted for exemplary description and, in another embodiment, the image coding apparatus may be divided into different modules according to a requirement to realize part or all of functions of the image coding apparatus.

Each module in the image coding apparatus provided in the embodiments of the application may be implemented in form of a computer program. The computer program may run in an electronic device. The program module formed by the computer program may be stored in a memory of the terminal or the server. The computer programs are executed by the processor to implement the actions of the methods described in the embodiments of the application.

Figure 12:
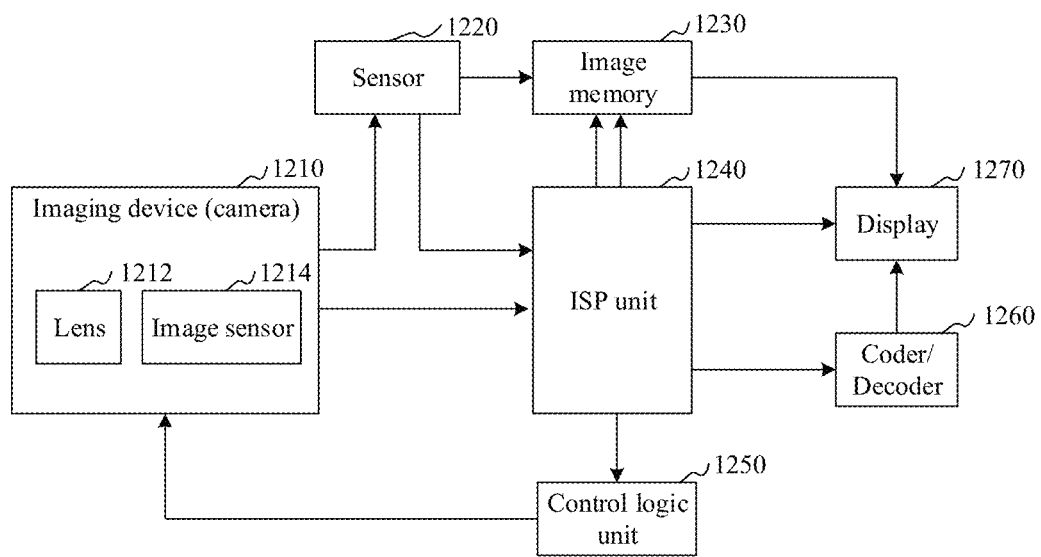
FIG. 12 is a schematic diagram of an image processing circuit according to an embodiment.

An embodiment of the application also provides an electronic device. The electronic device includes an image processing circuit, and the image processing circuit may be implemented by use of a hardware and/or software component, and may include various processing units defining an Image Signal Processing (ISP) pipeline. FIG. 12 is a schematic diagram of an image processing circuit according to an embodiment. As shown in FIG. 12, each aspect of an image processing technology related to the embodiments of the application is shown only, for convenient description.

As shown in FIG. 12, the image processing circuit includes an Image Signal Processing (ISP) unit 1240 and a control logic unit 1250. Image data captured by an imaging device 1210 is processed by the ISP unit 1240 at first, and the ISP unit 1240 analyzes the image data to capture image statistical information configurable to determine one or more control parameters of the imaging device 1210. The imaging device 1210 may include a camera with one or more lenses 1212 and an image sensor 1214. The image sensor 1214 may include a color filter array (for example, a Bayer filter), and the image sensor 1214 may acquire light intensity and wavelength information captured by each imaging pixel of the image sensor 1214 and provide a set of original image data processible for the ISP unit 1240. The sensor 1220 (for example, a gyroscope) may provide an acquired image processing parameter (for example, an anti-shake parameter) for the ISP unit 1240 based on an interface type of the sensor 1220. An interface of the sensor 1220 may adopt a Standard Mobile Imaging Architecture (SMIA) interface, another serial or parallel camera interface or a combination of the interfaces.

In addition, the image sensor 1214 may also send original image data to the sensor 1220, the sensor 1220 may provide the original image data for the ISP unit 1240 on the basis of the interface type of the sensor 1220, or the sensor 1220 stores the original image data in an image memory 1230.

The ISP unit 1240 processes the original image data pixel by pixel according to multiple formats. For example, each image pixel may have a bit depth of 8, 10, 12 or 14 bits. The ISP unit 1240 may execute one or more image processing operations on the original image data and collect the image statistical information about the image data. The image processing operations may be executed according to the same or different bit depth accuracy.

The ISP unit 1240 may further receive the image data from the image memory 1230. For example, the interface of the sensor 1220 sends the original image data to the image memory 1230, and the original image data in the image memory 1230 is provided for the ISP unit 1240 for processing. The image memory 1230 may be a part of a memory device, a storage device or an independent dedicated memory in the electronic device, and may include a Direct Memory Access (DMA) feature.

When receiving the original image data from the interface of the image sensor 1214 or from the interface of the image sensor 1220 or from the image memory 1230, the ISP unit 1240 may execute the one or more image processing operations, for example, time-domain filtering. The processed image data may be sent to the image memory 1230 for other processing before displaying. The ISP unit 1240 receives the processed data from the image memory 1230 and performs image data processing in an original domain and color spaces Red, Green and Blue (RGB) and YCbCr on the processed data. The image data processed by the ISP unit 1240 may be output to the display 1270 for a user to view and/or for further processing by a graphics engine or a Graphics Processing Unit (GPU). In addition, output of the ISP unit 1240 may further be sent to the image memory 1230, and the display 1270 may read the image data from the image memory 1230. In an embodiment, the image memory 1230 may be configured to implement one or more frame buffers. Moreover, the output of the ISP unit 1240 may be sent to a coder/decoder 1260 to code/decode the image data. The coded image data may be stored, and is decompressed before being displayed on the display 1270. The coder/decoder 1260 may be implemented by a Central Processing Unit (CPU) or a GPU or a coprocessor.

The statistical information determined by the ISP unit 1240 may be sent to the control logic unit 1250. For example, the statistical information may include statistical information of automatic exposure, automatic white balance, automatic focusing, flashing detection, black level compensation, shading correction of the lens 1212 and the like of the image sensor 1214. The control logic unit 1250 may include a processor and/microcontroller executing one or more routines (for example, firmware), and the one or more routines may determine the control parameter of the imaging device 1210 and the control parameter of the ISP unit 1240 according to the received statistical data. For example, the control parameter of the imaging device 1210 may include a control parameter (for example, a gain, integral time for exposure control and the anti-shake parameter) for the sensor 1220, a camera flashing control parameter, a control parameter (for example, a focal length for focusing or zooming) for the lens 1212 or a combination of these parameters. The control parameter for the ISP unit may include a gain level and color correction matrix configured for automatic white balance and color regulation (for example, during RGB processing) and a shading correction parameter for the lens 1212.

In the embodiment provided in the application, the imaging device 1210 may be configured to acquire each frame image in a video stream; the image memory 1230 is configured to store the image acquired by the imaging device 1210; the ISP unit 1240 may perform object detection on the image acquired by the imaging device 1210 in the video stream to obtain an object region, in which an object is located, from the image; and the coder/decoder 1260 may perform coding processing on the processed image, namely dividing the reference image into multiple pixel blocks and performing coding processing on each of the pixel blocks in multiple coding modes respectively, to obtain multiple sets of coded data for the pixel block, each set corresponding to a respective one of the multiple coding modes, determine a cost parameter of the pixel block based on relative position relationship between the pixel block and the object region, obtain a coding cost in each of the multiple coding modes for the pixel block, according to the cost parameter of the pixel block and the coded data in the coding mode and determine one of the multiple sets of coded data, corresponding to a lowest one of the obtained coding costs, to be target coded data for the pixel block. The electronic device may implement the image coding method provided in the abovementioned embodiment through the image processing circuit. Elaborations are omitted herein.

An embodiment of the application also provides a computer-readable storage medium.

One or more nonvolatile computer-readable storage media include computer-executable instructions, the computer-executable instructions being executed by one or more processors to enable the processors to execute the actions of the image coding method.

A computer program product including an instruction runs in a computer to enable the computer to execute the image coding method.

Any citation of a memory, storage, database or another medium used in the embodiments of the application may include nonvolatile and/or nonvolatile memories. A proper nonvolatile memory may include a Read-Only Memory (ROM), a Programmable ROM (PROM), an Electrically Programmable ROM (EPROM), an Electrically Erasable Programmable ROM (EEPROM) or a flash memory. The volatile memory may include a Random Access Memory (RAM), and is used as an external high-speed buffer memory. Exemplarily but unlimitedly, the RAM may be obtained in various forms, for example, a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM), a Rambus Direct RAM (RDRAM), a Direct RDRAM (DRDRAM) and a Rambus Dynamic RAM (RDRAM).

It should be understood that "a plurality" as referred to herein means one or more.

The abovementioned embodiments only express some implementation modes of the application and are specifically described in detail and not thus understood as limits to the patent scope of the application. It is to be pointed out that those of ordinary skill in the art may further make a plurality of transformations and improvements without departing from the concept of the application and all of these fall within the scope of protection of the application. Therefore, the scope of patent protection of the application should be according to the appended claims.

Embodiments of the disclosure provide a method and apparatus for image coding, an electronic device and a computer-readable storage medium, which can improve an image coding processing effect.

A method for image coding may include the following operations.

An object region is acquired from a reference image.

A plurality of pixel blocks forming the reference image are acquired, and multiple sets of coded data for the plurality of pixel blocks are obtained by coding each pixel block in multiple coding modes respectively, each set of the coded data corresponds to a coding mode of the multiple coding modes.

A cost parameter of the plurality pixel blocks is determined based on a relative position relationship between the plurality pixel blocks and the object region.

A coding cost in each of the multiple coding modes for the plurality pixel blocks is obtained based on the cost parameter of the plurality pixel blocks and the coded data in each coding mode.

A set of coded data corresponding to the coding mode with a lowest coding cost is determined as target coded data for the plurality pixel blocks.

An apparatus for image coding may include an object recognition module, a coding processing module, a parameter determination module, a cost calculation module and a coded data determination module.

The object recognition module may be configured to acquire an object region from a reference image.

The coding processing module may be configured to acquire a plurality of pixel blocks forming the reference image and obtain multiple sets of coded data for the plurality pixel blocks by coding each pixel block in multiple coding modes respectively, each set of the coded data corresponding to a coding mode of the multiple coding modes.

The parameter determination module may be configured to determine a cost parameter of the plurality of the pixel blocks based on a relative position relationship between the plurality of the pixel blocks and the object region.

The cost calculation module may be configured to obtain a coding cost in each of the multiple coding modes for the plurality of the pixel blocks based on the cost parameter of the plurality of the pixel blocks and the coded data in each coding mode.

The coded data determination module may be configured to determine a set of coded data corresponding to the coding mode with a lowest coding cost as target coded data for the plurality of the pixel blocks.

An electronic device may include a memory and a processor. A computer program may be stored in the memory, and the computer program may be executed by the processor to enable the processor to execute the following actions.

An object region is acquired from a reference image.

A plurality of pixel blocks forming the reference image are acquired, and multiple sets of coded data for the plurality pixel blocks are obtained by coding each pixel block in multiple coding modes respectively, each set of the coded data corresponds to a coding mode of the multiple coding modes.

A cost parameter of the plurality pixel blocks is determined based on a relative position relationship between the plurality pixel blocks and the object region.

A coding cost in each of the multiple coding modes for the plurality pixel blocks is obtained based on the cost parameter of the plurality pixel blocks and the coded data in each coding mode.

A set of coded data corresponding to the coding mode with a lowest coding cost is determined as target coded data for the plurality pixel blocks.

A computer-readable storage medium may store a computer program, the computer program being executed by a processor to implement the following actions.

An object region is acquired from a reference image.

A plurality of pixel blocks forming the reference image are acquired, and multiple sets of coded data for the plurality pixel blocks are obtained by coding each pixel block in multiple coding modes respectively, each set of the coded data corresponds to a coding mode of the multiple coding modes.

A cost parameter of the plurality pixel blocks is determined based on a relative position relationship between the plurality pixel blocks and the object region.

A coding cost in each of the multiple coding modes for the plurality pixel blocks is obtained based on the cost parameter of the plurality pixel blocks and the coded data in each coding mode.

A set of coded data corresponding to the coding mode with a lowest coding cost is determined as target coded data for the plurality pixel blocks.

According to the method and apparatus for image coding, the electronic device and the computer-readable storage medium, the cost parameter of the pixel block may be determined according to the relative position relationship between the pixel block and the object region, that is a distortion weight value or bit rate weight value of the pixel block may be dynamically regulated, so that image details of the object region or outside the object region may be selectively retained, and an image coding processing effect may be improved.

The invention claimed is:

1. A method for image coding, comprising:
   acquiring an object region from a reference image;
   acquiring a plurality of pixel blocks forming the reference image;
   obtaining multiple sets of coded data for the plurality of the pixel blocks by coding each pixel block in multiple coding modes, each set of the coded data corresponding to a coding mode of the multiple coding modes;
   determining a cost parameter of the plurality of the pixel blocks based on a relative position relationship between the plurality of the pixel blocks and the object region;
   obtaining a coding cost in each of the multiple coding modes for the plurality of the pixel blocks based on the cost parameter of the plurality of the pixel blocks and the coded data in each coding mode; and
   determining a set of coded data corresponding to the coding mode with a lowest coding cost as target coded data for the plurality of the pixel blocks,
   wherein determining the cost parameter of the plurality of the pixel blocks based on the relative position relationship between the plurality of the pixel blocks and the object region comprises:
   acquiring a background region in the reference image other than the object region;
   when the plurality of the pixel blocks are located in the object region, increasing a distortion weight value in a preset cost parameter to obtain a cost parameter corresponding to the plurality of the pixel blocks; and
   when the plurality of the pixel blocks are located in the background region, decreasing a bit rate weight value in the preset cost parameter to obtain a cost parameter corresponding to the plurality of the pixel blocks.

2. The method of claim 1, further comprising:
   performing padding processing on the object region to obtain a transition region; and
   when the plurality of the pixel blocks are located in the transition region, determining the preset cost parameter to be a cost parameter corresponding to the plurality of the pixel blocks.

3. The method of claim 1, further comprising: before acquiring the plurality of the pixel blocks in the reference image:
   acquiring a background region in the reference image other than the object region; and
   dividing the object region into multiple first pixel blocks of a first size, and
   dividing the background region into multiple second pixel blocks of a second size, wherein the first size is smaller than the second size.

4. The method of claim 1, further comprising: after determining the set of coded data corresponding to the coding mode with the lowest coding cost as the target coded data for the plurality of the pixel blocks, performing transformation on the target coded data to obtain a one-dimensional array corresponding to the plurality of the pixel blocks;

when the plurality of the pixel blocks are located in the object region, performing quantization on the one-dimensional array by use of a first step length; and when the plurality of the pixel blocks are located in a background region in the reference image other than the object region, performing quantization on the one-dimensional array by use of a second step length, wherein the first step length is less than the second step length.

5. The method of claim 1, wherein the reference image is a key frame image in a video stream, and the method further comprises: before acquiring the object region from the reference image, sequentially acquiring each frame image in the video stream;

recognizing an object region in each frame image; and in a case that an object region in a present frame image is mismatched with an object region in a previous key frame image, determining the present frame image to be the reference image.

6. The method of claim 1, wherein acquiring the object region from the reference image comprises:

acquiring the reference image;

generating a central weight map corresponding to the reference image, wherein weight values represented by the central weight map gradually decrease from center to edge;

inputting the reference image and the central weight map into an object detection model to obtain an object region confidence map; and determining an object in the reference image and acquiring the object region in which the object is located, according to the object region confidence map.

7. The method of claim 6, wherein determining the object in the reference image and acquiring the object region in which the object is located, according to the object region confidence map comprises:

processing the object region confidence map to obtain an object mask pattern;

detecting the reference image to determine a bright region in the reference image; and determining an object in the reference image and acquiring the object region in which the object is located, according to the bright region in the reference image and the object mask pattern.

8. The method of claim 6, wherein determining the object in the reference image and acquiring the object region in which the object is located, according to the object region confidence map comprises:

obtaining a region where each of multiple objects is located in the reference image and a category corresponding to each object according to the object region confidence map;

determining an object based on a priority of a category and a size of a region, corresponding to each of the multiple objects; and determining a region where the object is located to be the object region.

9. The method of claim 1, wherein the coding cost in each of the multiple coding modes is obtained with a formula comprising:

J(mode)=A*SSD+B*R, where J(mode) represents the coding cost in the coding mode, SSD is a distortion rate, A is a distortion weight value, R is a bit rate of the plurality of the pixel blocks corresponding to the coding mode and B is a bit rate weight value.

10. An electronic device, comprising:

a memory; and a processor, wherein a computer program is stored in the memory, and the computer program is executed by the processor to enable the processor to execute the following operations:

acquiring an object region from a reference image;

acquiring a plurality of pixel blocks forming the reference image;

obtaining multiple sets of coded data for the plurality of the pixel blocks by coding each pixel block in multiple coding modes, each set of the coded data corresponding to a coding mode of the multiple coding modes;

determining a cost parameter of the plurality of the pixel blocks based on a relative position relationship between the plurality of the pixel blocks and the object region;

obtaining a coding cost in each of the multiple coding modes for the plurality of the pixel blocks based on the cost parameter of the plurality of the pixel blocks and the coded data in each coding mode; and determining a set of coded data corresponding to the coding mode with a lowest coding cost as target coded data for the plurality of the pixel blocks, wherein the computer program is executed by the processor to enable the processor to:

acquire a background region in the reference image other than the object region;

when the plurality of the pixel blocks are located in the object region, increase a distortion weight value in a preset cost parameter to obtain a cost parameter corresponding to the plurality of the pixel blocks; and when the plurality of the pixel blocks are located in the background region, decrease a bit rate weight value in the preset cost parameter to obtain a cost parameter corresponding to the plurality of the pixel blocks.

11. The electronic device according to claim 10, wherein the computer program is executed by the processor to enable the processor to:

perform padding processing on the object region to obtain a transition region; and when the plurality of the pixel blocks are located in the transition region, determine the preset cost parameter to be a cost parameter corresponding to the plurality of the pixel blocks.

12. The electronic device according to claim 10, wherein the computer program is executed by the processor to enable the processor to:

acquire a background region in the reference image other than the object region; and divide the object region into multiple first pixel blocks of a first size, and divide the background region into multiple second pixel blocks of a second size, wherein the first size is smaller than the second size.

13. The electronic device according to claim 10, wherein the computer program is executed by the processor to enable the processor to: after determining the set of coded data corresponding to the coding mode with the lowest coding cost as the target coded data for the plurality of the pixel blocks, perform transformation on the target coded data to obtain a one-dimensional array corresponding to the plurality of the pixel blocks;

when the plurality of the pixel blocks are located in the object region, perform quantization on the one-dimensional array by use of a first step length; and when the plurality of the pixel blocks are located in a background region in the reference image other than the object region, perform quantization on the one-dimensional array by use of a second step length, wherein the first step length is less than the second step length.

14. The electronic device according to claim 10, wherein the reference image is a key frame image in a video stream, and the computer program is executed by the processor to enable the processor to: before acquiring the object region from the reference image, sequentially acquire each frame image in the video stream;

recognize an object region in the frame image; and in a case that an object region in a present frame image is mismatched with an object region in a previous key frame image, determine the present frame image to be the reference image.

15. The electronic device according to claim 10, wherein the computer program is executed by the processor to enable the processor to:

acquire the reference image;

generate a central weight map corresponding to the reference image, wherein weight values represented by the central weight map gradually decrease from center to edge;

input the reference image and the central weight map into an object detection model to obtain an object region confidence map; and determine an object in the reference image and acquire the object region in which the object is located, according to the object region confidence map.

16. The electronic device according to claim 15, wherein the computer program is executed by the processor to enable the processor to:

process the object region confidence map to obtain an object mask pattern;

detect the reference image to determine a bright region in the reference image; and determine the object in the reference image and acquire the object region in which the object is located, according to the bright region in the reference image and the object mask pattern.

17. The electronic device according to claim 15, wherein the computer program is executed by the processor to enable the processor to:

obtain a region where each of multiple objects is located in the reference image and a category corresponding to each object according to the object region confidence map;

determine an object based on a priority of a category and a size of a region, corresponding to each of the multiple objects; and determine a region where the object is located to be the object region.

18. A non-transitory computer-readable storage medium, in which a computer program is stored, wherein the computer program is executed by a processor to implement the following operations:

acquiring an object region from a reference image;

acquiring a plurality of pixel blocks forming the reference image;

obtaining multiple sets of coded data for the plurality of the pixel blocks by coding each pixel block in multiple coding modes, each set of the coded data corresponding to a coding mode of the multiple coding modes;

determining a cost parameter of the plurality of the pixel blocks based on a relative position relationship between the plurality of the pixel blocks and the object region;

obtaining a coding cost in each of the multiple coding modes for the plurality of the pixel blocks based on the cost parameter of the plurality of the pixel blocks and the coded data in each coding mode; and determining a set of coded data corresponding to the coding mode with a lowest coding cost as the target coded data for the plurality of the pixel blocks, wherein the computer program is executed by the processor to:

acquire a background region in the reference image other than the object region;

when the plurality of the pixel blocks are located in the object region, increase a distortion weight value in a preset cost parameter to obtain a cost parameter corresponding to the plurality of the pixel blocks; and when the plurality of the pixel blocks are located in the background region, decrease a bit rate weight value in the preset cost parameter to obtain a cost parameter corresponding to the plurality of the pixel blocks.

* * * * *